United States Patent [19]

Titcomb

[11] 4,422,080

[45] Dec. 20, 1983

[54] INK JET PRINTING METHOD AND APPARATUS

[75] Inventor: Stanley C. Titcomb, San Jose, Calif.

[73] Assignee: International Business Machines Corporation, Armonk, N.Y.

[21] Appl. No.: 331,695

[22] Filed: Dec. 17, 1981

[51] Int. Cl.[3] .......... G01D 15/18

[52] U.S. Cl. .......... 346/1.1; 346/75

[58] Field of Search .......... 346/1.1, 75, 140

[56] References Cited

U.S. PATENT DOCUMENTS

| | | | |
|---|---|---|---|
| 3,891,121 | 6/1975 | Stoneburner | 346/75 X |
| 4,042,937 | 8/1977 | Perry et al. | 346/1.1 |
| 4,187,512 | 2/1980 | Matsunaga et al. | 346/140 IJ |

*Primary Examiner*—Donald A. Griffin
*Attorney, Agent, or Firm*—Otto Schmid, Jr.

[57] ABSTRACT

A method and apparatus for controlling the flow of ink in an ink jet printing system which includes an ink supply reservoir and an ink jet print head comprising an ink inlet, and ink outlet and an ink cavity between the inlet and outlet in fluid communication with a plurality of closely spaced orifices. Valve means are included in the ink inlet and ink outlet, and the valve means are both open to provide an operative mode in which the ink cavity is filled with pressurized ink and a stream of ink is produced from each of the orifices. An idle mode is established periodically when printing is not desired by substantially simultaneously closing both valve means to interrupt the flow of pressurized ink through the print head. The ink then in the print head drains until the surface tension forces at the orifices exceed the pressure within the head. The result is a positive pressure within the print head which is sealed off with the result that no contaminant material is drawn into the print head.

8 Claims, 3 Drawing Figures

INK JET PRINTING METHOD AND APPARATUS

BACKGROUND OF THE INVENTION

1. Field of Invention

This invention relates to a method and apparatus for controlling the pressurized ink to an ink jet printing head so that the print head is sealed off full of ink during non-printing periods.

2. Description of Prior Art

There has been known in the prior art pressurized ink jet systems. In the binary type pressurized ink jet system described in U.S. Pat. No. 3,373,437 to Sweet et al, a plurality of jets is provided in one or more rows. The jets are broken up into a series of uniform ink drops which are selectively charged at drop breakoff with a single charge amplitude so that the charged drops are deflected by a constant field to an ink drop gutter. The uncharged ink drops continue along the original jet stream paths to impact the recording medium. A visible human-readable record can be formed in this manner by leaving uncharged those drops required for printing during relative print head-to-recording medium motion.

To meet the present resolution requirements for computer systems printing applications, it is a requirement of the multi-jet binary systems for the jets to be closely spaced and to produce a small diameter mark on the recording medium. The resolution requirements dictate the use of very small nozzle openings, and, as the nozzle openings become smaller, the nozzles become more vulnerable to clogging. Prior art systems provided some control over the ink supply system and the sequencing of operations for startup, operation and shutoff of the pressurized ink systems. However, these systems have not always been successful in preventing entrance of contaminant material into the ink system which may result in clogged nozzles and unacceptably poor print quality.

SUMMARY OF THE INVENTION

It is, therefore, the object of the present invention to provide a method and apparatus for operating a pressurized ink jet system while maintaining the print head free of contaminant materials.

In accordance with the present invention, there is provided a pressurized ink jet system including an ink supply and an ink jet print head comprising an inlet, an outlet and an ink cavity between having at least one orifice in fluid communication with the ink cavity, the ink supply including a source of pressurized ink connected to the inlet through a first valve means and connected to the outlet through a second valve means. The valve means are sequenced so that the entire ink cavity within the print head is filled with ink and a stream of ink flows from the orifice to establish an operative mode. The valve means are periodically sequenced, when printing is not desired, to establish an idle mode comprising sealing off the ink cavity full of ink to prevent ink from flowing either from the orifice or into the orifice to prevent contaminants from entering the print head.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
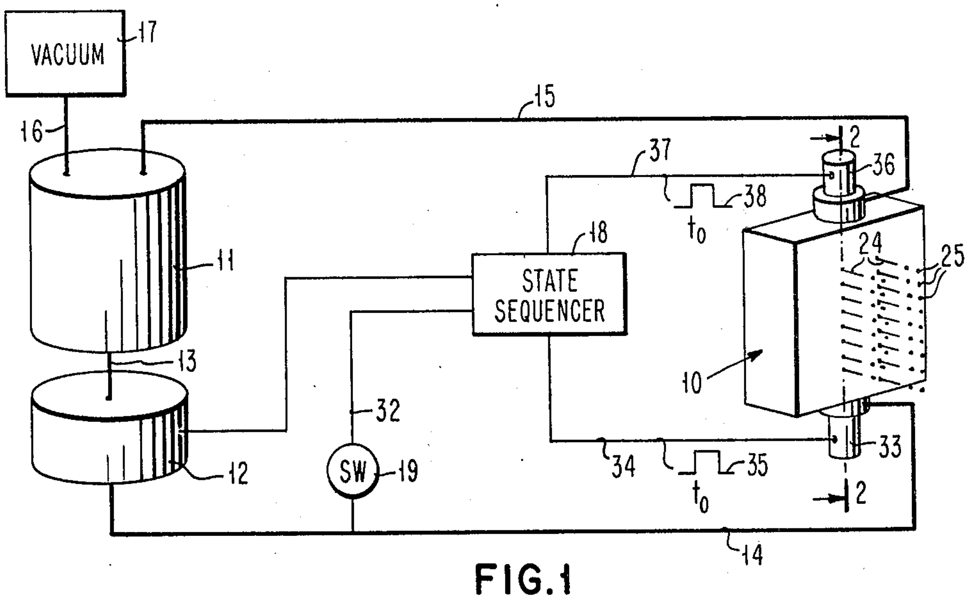
FIG. 1 is a perspective view of an ink system and an ink jet print head constructed in accordance with the present invention.

Referring to FIG. 1, an ink jet printing apparatus is shown. The apparatus comprises an ink reservoir 11 and an ink pump 12 which are coupled to provide a flow of pressurized ink to ink jet printing head 10 by means of conduits 13 and 14. Return line conduit 15 is provided to carry ink back to reservoir 11. Also coupled to reservoir 11 by conduit 16 is a vacuum source 17. A state sequencer 18 is provided to produce control signals at the appropriate time in the operation of the ink jet printing system. These control signals include those necessary for operating pump 12 as well as any valves in the system which require control signals.

Print head 10 comprises a head body 20 having an ink cavity 21 formed therein which is covered by a nozzle plate 22 to form a substantially enclosed ink reservoir. Nozzle plate 22 has a plurality of orifices 23 formed therein in at least one row so that a plurality of streams 24 of ink are produced when pressurized ink fills ink cavity 21. The streams 24 of ink are broken up into uniform size and equally spaced drops 25 by means of an electromechanical transducer 26 attached to the back of head body 20.

An ink inlet passage 27 leads from conduit 14 to ink cavity 21 and a valve means 28 is included within the inlet passage which is operable to cut off the flow of ink into print head 10. A second valve means 29 is included within outlet ink passage 30 which transmits ink from ink cavity 21 to return conduit 15, and valve means 29 is operable to cut off the flow of ink from print head 10.

Pump 12 may be any suitable type operable under generally low flow conditions at a selected pressure commensurate with the type of ink jet system, for example, a suitable pressure in the range of 15–25 pounds per square inch, and capable of operating under a no flow condition to produce a significantly higher pressure on the fluid in conduit 14 of, for example, 60–80 pounds per square inch. The no flow condition is established by closing valve means 28 while the pump 12 is running. Suitable pressure regulators of conventional design are also used, if required.

Print head 10 may comprise any suitable print head. One example of a suitable print head is that described in commonly assigned U.S. Pat. No. 4,188,635 issued Feb. 12, 1980 to Giordano et al. Note that while only a few orifices 23 are shown in the drawing, in actual practice the number of orifices permits printing at a resolution of at least 240 drops per inch. The small size of the orifices makes them vulnerable to clogging, and the operating position of the print head closely spaced from the print medium exposes the print head to a variety of contaminant materials including paper fibers, cellulose, starch, rosin and chemically active sizing materials. Clogging of one of the orifices 23 may produce unacceptable print quality which would result in a shut-down of the print head. This would not be acceptable in a printer operating on-line with a data processing system.

Figure 2:
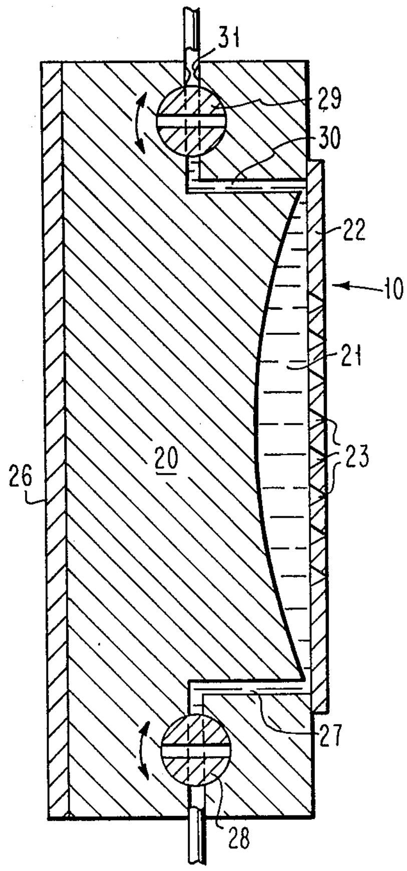
FIG. 2 is a section view along the lines 2—2 in FIG. 1.
Figure 3:
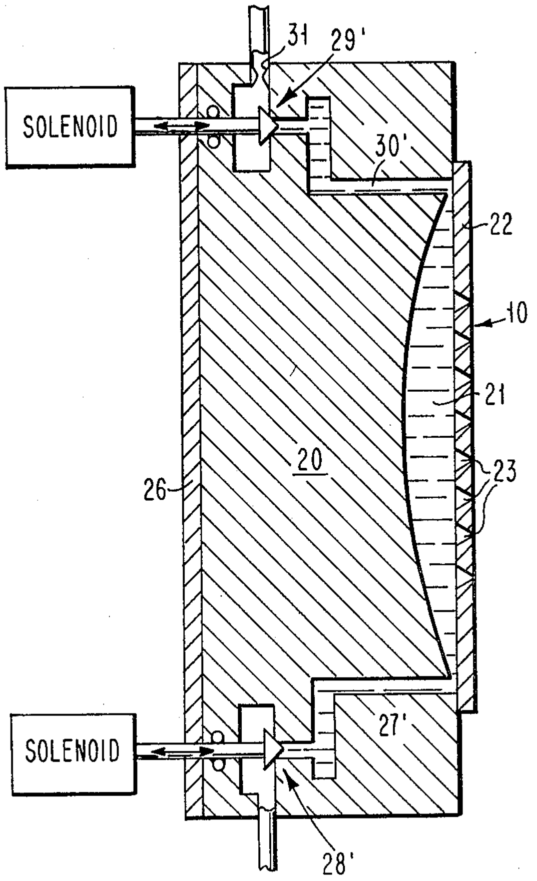
FIG. 3 is a section view showing an alternate embodiment for the valve means shown in FIGS. 1 and 2.

Valve means 28 and 29 may comprise any suitable valves which can be closed or opened with essentially zero displacement of the fluid within the flow path so that substantially no reflections or turbulence is created within the fluid within the print head when both valves are closed substantially simultaneously. Excessive turbulence within the print head may cause the meniscus from one or more of orifices 23 to be drawn in below the level of the nozzle plate, thereby creating the possibility that contaminants may also be drawn into the print head. Rotary valve means 28, 29 are shown in FIG. 2 which are solenoid actuated, and linearly actuated valve means 28′, 29′ are shown in FIG. 3 which are also solenoid actuated. Valve means 28, 29 may also be actuated by various electrical, electromechanical or mechanical means which are capable of being actuated in response to a signal from sequencer 18. In addition, valve means 28 and 29 may be operated manually in cases where proper timing of actuation of the valve means can be maintained.

The print head 10 along with valve means 28 and 29 according to the present invention prevents drawing contaminant materials into the print head 10 by adopting an operating cycle which always maintains a positive pressure within the print head so that any flow is out of the print head. Prior art print heads and operating cycles permitted the possibility that contaminants could be drawn into the print head as the meniscus of ink at the orifice collapsed at each of the pressure-down cycles in which ink was drained from the print head. In addition, detachment of, or a leak within any one of the conduits in the prior art print heads permitted the possibility that contaminants could be drawn into the print head. A suitable filter may be placed within conduit 14 near print head 10 to block any contaminant material from entering the print head with the ink supplied by pump means 12.

In the operation of ink jet systems, it has been found advantageous to purge any air from the print head 10 prior to startup. Thus, the first operation in an initial startup comprises operation of state sequencer 18 to produce signals on lines 34 and 37 to open both valve means 28 and valve means 29. The sequencer also controls pump 12 to produce a low pressure flow through conduit 14 and through the print head 10. This low pressure flow, created by the low fluidic resistance of the system, produces flow through the print head 10 but not out of nozzle orifices 23. Any air from the print head is thus forced into reservoir 11 and drawn off by vacuum source 17. The pressure in the head is insufficient to overcome the surface tension of the ink at the nozzle orifices 23, thereby holding the ink in the print head. Both valve means 28 and 29 are then closed to prevent the introduction of air into the print head.

For startup of the system, both valve means 28 and valve means 29 remain closed. Pump 12 continues to run and, therefore, increases the pressure in conduit 14. When the pressure reaches the required high pressure for startup, switch 19 closes, providing a signal on line 32 to state sequencer 18. Sequencer 18 responds by generating a signal on line 34 to open valve means 28. Opening valve means 28 at the high pressure, such as 60 psi, creates an instantaneous surge in print head 10, thus cleanly starting the ink jet streams 24. For normal operation, the valve means are positioned unchanged with valve means 28 open and valve means 29 closed. The ink flow in the form of streams causes the pressure to decay from that of startup to the operating pressure created by the fluidic resistance of the nozzle orifices. At this time, valve means 29 is opened and the operating pressure is maintained in print head 10 by means of restrictor means 31 in the outlet ink passage past valve means 29. The operating pressure and the inside diameter of restrictor 31 is chosen so that about twenty percent of the ink delivered to the print head exits through restrictor 31 and conduit 15 back to ink reservoir 11.

For shutoff, both valve means 28 and valve means 29 are substantially simultaneously closed by signals 35, 38 generated by sequencer 18 and coupled on lines 34, 37 to control the valve means. Note that each of the signals are generated at the same time $t_o$. The ink streams collapse with the reduction in pressure and ink continues to run from orifices 23 until surface tension forces are greater than the remaining pressure within print head 10. This pressure is a positive pressure which is generally less than 1 psi, and at this time, an idle mode is established and there is no further flow of ink out of the print head 10.

By the use of the cycle of operation described above, the print head 10 is always filled with ink at a positive pressure so that no contaminant material is drawn into the print head as the ink drains from the print head. The print head can be maintained in the idle mode during intervals during which no printing is desired, during storage, and transport of the print head from one location to another.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new and desire to secure by Letters Patent is:

1. The method for control of ink from a pressurized fluid reservoir to an ink jet print head comprising an ink cavity having at least one orifice in fluid communication with the ink cavity, wherein the improvement comprises the steps of:

establishing an operative mode in which the entire ink cavity is full of fluid at a pressure such that fluid issues as a stream from said orifice; and thereafter establishing an idle mode in which no printing occurs by sealing off the ink cavity full of pressurized fluid thereby to maintain a positive pressure in the fluid in the ink cavity during the ensuing idle mode to prevent fluid from either flowing from said orifice or into said orifice to prevent contaminants from entering said ink jet print head.

2. The method according to claim 1 wherein said print head has a plurality of closely spaced orifices in at least one row and wherein said step of establishing an operative mode produces a uniform stream of ink from each of said orifices.

3. The method according to claim 2 wherein said print head additionally comprises electromechanical means to break up said streams of ink into ink drops of substantially equal size and uniform spacing, and wherein said step of establishing an operative mode produces drops capable of printing at a resolution of at least 240 drops per inch.

4. The method according to claim 1 wherein said print head additionally comprises ink inlet means for conveying ink into said ink cavity, ink outlet means for conveying ink out from said ink cavity, a first selectively operable valve means in said ink inlet means, and a second selectively operable valve means in said ink outlet means, and wherein said step of establishing an idle mode comprises substantially simultaneously closing said first and said second valve means.

5. The apparatus for control of ink from a pressurized fluid reservoir to an ink jet print head comprising an ink cavity having at least one orifice in fluid communication with the ink cavity, wherein said improvement comprises:

means for establishing an operative mode in which the entire ink cavity is full of pressurized fluid at a pressure such that ink issues as a stream from said orifice; and means for establishing an idle mode in which no printing occurs by sealing off the ink cavity full of pressurized fluid so that in the idle mode the ink cavity remains full of fluid at a pressure above atmospheric pressure to prevent fluid from either flowing from said orifice or into said orifice to prevent contaminants from entering said ink jet print head.

6. The apparatus according to claim 5 wherein said print head comprises a plurality of closely spaced orifices in at least one row and wherein said means for establishing an operative mode produces a uniform stream of ink from each of said orifices.

7. The apparatus according to claim 6 wherein said print head additionally comprises electromechanical means to break up said streams of ink into ink drops of substantially equal size and uniform spacing, and wherein said means for establishing an operative mode produces drops capable of printing at a resolution of at least 240 drops per inch.

8. The apparatus according to claim 5 wherein said print head additionally comprises ink inlet means for conveying ink into said ink cavity, ink outlet means for conveying ink out from said ink cavity, a first selectively operable valve means in said ink inlet means, and a second selectively operable valve means in said ink outlet means, and wherein said means for establishing an idle mode comprises means for substantially simultaneously closing said first and said second valve means.

* * * * *